United States Patent
Venugopal et al.

(10) Patent No.: US 12,165,076 B2
(45) Date of Patent: Dec. 10, 2024

(54) TRAINING A MACHINE LEARNING ALGORITHM TO PREDICT WHEN COMPUTING DEVICES MAY HAVE ISSUES

(71) Applicant: Dell Products L. P., Round Rock, TX (US)

(72) Inventors: Lokesh Venugopal, Georgetown, TX (US); Amit Sawhney, Round Rock, TX (US); Sachin Jayant Deo, Coquitlam (CA)

(73) Assignee: Dell Products L.P., Round Rock, TX (US)

( * ) Notice: Subject to any disclaimer, the term of this patent is extended or adjusted under 35 U.S.C. 154(b) by 942 days.

(21) Appl. No.: 16/944,251

(22) Filed: Jul. 31, 2020

(65) Prior Publication Data

US 2022/0036214 A1     Feb. 3, 2022

(51) Int. Cl.
*G06N 5/04*     (2023.01)
*G06N 20/00*     (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 7,271,608 B1 * | 9/2007 | Vermeire ........... | G01R 31/2879 340/653 |
| 11,113,987 B1 * | 9/2021 | Jaggers ................... | G09B 5/04 |
| 2008/0172268 A1 * | 7/2008 | Wingenter ............. | G06Q 10/20 705/305 |
| 2008/0177613 A1 * | 7/2008 | Chan .................. | G06Q 10/0631 705/7.38 |
| 2014/0136443 A1 * | 5/2014 | Kinsey, II ...... | G06Q 10/063116 705/347 |
| 2017/0034023 A1 * | 2/2017 | Nickolov ............ | H04L 43/0817 |
| 2019/0196430 A1 * | 6/2019 | Seo .................... | G06Q 10/0635 |

(Continued)

OTHER PUBLICATIONS

Pecht et al. (Predicting the Reliability of Electronic Equipment, Jul. 1994, pp. 992-1004) (Year: 1994).*

(Continued)

*Primary Examiner* — George Giroux
(74) *Attorney, Agent, or Firm* — Krishnendu Gupta; Deepika Bhayana; Nikhil Patel

(57) ABSTRACT

In some examples, a server may use machine learning to determine, based on service requests associated with multiple computing devices, that a component included in the multiple computing devices is predicted to fail at a particular date. The server may use the machine learning to determine, based on the particular date and an expiration date of a warranty associated with the computing devices, that a customer may initiate a service request on a predicted service date. The machine learning may determine recommended solutions including purchasing an extended warranty, purchasing extended services (e.g., on-site service), purchasing a depot clinic service, or trading in the multiple computing devices for newer computing devices. In response to receiving a purchase order to purchase at least one of the recommended solutions, the server may initiate at least one of the recommended solutions.

20 Claims, 6 Drawing Sheets

(56) References Cited

U.S. PATENT DOCUMENTS

| | | | |
|---|---|---|---|
| 2019/0196893 A1* | 6/2019 | Lee | G06F 11/0727 |
| 2020/0042933 A1* | 2/2020 | Jurich, Jr. | G06Q 10/0832 |
| 2020/0111015 A1* | 4/2020 | Liu | G06N 3/045 |
| 2020/0118675 A1* | 4/2020 | Schriver | G06Q 10/20 |
| 2020/0279180 A1* | 9/2020 | Yu | G06Q 30/016 |
| 2020/0364636 A1* | 11/2020 | Bertoni Scarton | G06N 3/045 |
| 2021/0303378 A1* | 9/2021 | Sethi | G06F 18/2178 |

OTHER PUBLICATIONS

Brosch et al. (Architecture-Based Reliability Prediction with the Palladio Component Model, Dec. 2012, pp. 1319-1339) (Year: 2012).*

McLinn (Reliability Predictions—More than the Sum of the Parts, May 2009, pp. 1-6) (Year: 2009).*

Bhargava et al. (Failure Prediction and Health Prognostics of Electronic Components: A Review, Mar. 2014, pp. 1-5) (Year: 2014).*

* cited by examiner

TRAINING A MACHINE LEARNING ALGORITHM TO PREDICT WHEN COMPUTING DEVICES MAY HAVE ISSUES

BACKGROUND OF THE INVENTION

Field of the Invention

This invention relates generally to computing devices and, more particularly to predicting, based on a component failure rate, when a set of computing devices are predicted to have issues (e.g., due to the component failing).

DESCRIPTION OF THE RELATED ART

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a manufacturer (e.g., Dell®) offers a device for acquisition (e.g., lease or purchase), the device comes with a warranty, also known as a services entitlement. A customer may retain the standard services entitlement or may purchase an enhanced and/or extended warranty.

When a customer has an issue with the device, the customer may contact the manufacturer's Technical Support group, which provides service according to the terms of the associated warranty. This model works well for customers, such as consumers, with a few devices. This model does not work well for Enterprise customers that may have tens, hundreds, or even thousands of devices. For example, an Enterprise may not call Technical Support for a few devices and may instead wait until a large number of devices have issues and then make a call to Technical Support requesting support for multiple devices (e.g., a large number of devices, such as hundreds or thousands of devices). As another example, an Enterprise may allow issues to accumulate and then, prior to the expiry of the warranty associated with multiple devices, contact Technical Support and ask to have the multiple devices serviced under warranty.

Such cases, where a customer contacts Technical Support regarding servicing multiple devices, may cause strain on the supply chain, availability of technicians, and the like and may negatively affect customer satisfaction. For example, the manufacturer may not have anticipated that multiple devices (e.g., hundreds or thousands of devices) would have an issue caused by a component failure and may not have a sufficient quantity of a particular set of components in stock to quickly service the multiple devices. As another example, the manufacturer may not have anticipated servicing the multiple devices at the same time and may lack sufficient number of technicians to address the issue in a way that satisfies a service level agreement (SLA) associated with the warranty specifying that devices are to be repaired within a specified period of time. As a further example, if the devices are sufficiently old, the particular component that is failing (and causing issues) may no longer be manufactured, making it difficult for the multiple devices to be serviced. Moreover, if the SLA specifies that devices that cannot be repaired in the specified time period are to be replaced by the manufacturer, then the manufacturer may incur significant costs replacing at least a portion of the multiple devices to satisfy the SLA due to a lack of technicians, lack of components, or the like. Even if there is no specific SLA, the lack of technicians and/or components may result in a slow and drawn out repair process that adversely impacts customer satisfaction.

Thus, a manufacturer of multiple devices may receive a warranty request from a customer to service multiple devices that have issues caused by a set of one or more components failing. The inability of the manufacturer to anticipate and proactively prepare for such events may adversely impact the manufacturer's profitability, customer satisfaction, and the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may use machine learning to determine, based on service requests associated with multiple computing devices, that a component included in the multiple computing devices is predicted to fail at a particular date. The server may use the machine learning to determine, based on the particular date and an expiration date of a warranty associated with the computing devices, that a customer may initiate a service request on a predicted service date. The machine learning may determine recommended solutions including purchasing an extended warranty, purchasing extended services (e.g., on-site service), purchasing a depot clinic service, or trading in the multiple computing devices for newer computing devices. In response to receiving a purchase order to purchase at least one of the recommended solutions, the server may initiate at least one of the recommended solutions.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
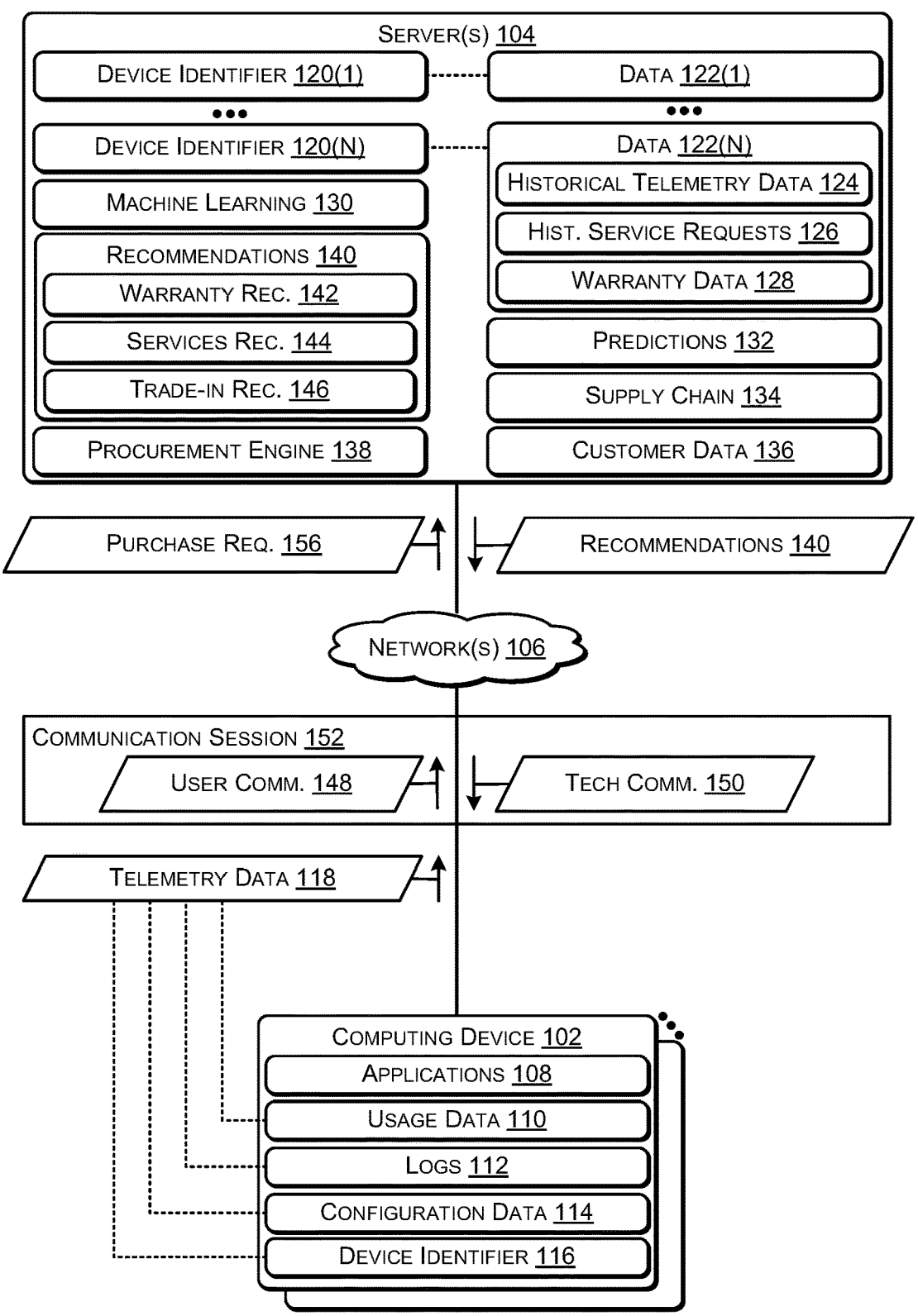
FIG. 1 is a block diagram of a system that includes a server to predict when one or more computing devices may have an issue, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A computer manufacturer, such as, for example, Dell®, may provide a warranty when a customer purchases a set of computing devices (e.g., IHS), such as, for example, tablets, laptops, 2-in-1s (e.g., a 2-in-1 is laptop in which a tablet portion can be detached from and used independently of a keyboard portion), desktops, servers, and the like. The computer manufacturer may have a server that stores data and makes predictions, using one or more machine learning algorithms. For example, the data stored by the server may include telemetry data that each of the manufacturer's computing devices sends to the server. The telemetry data may be sent periodically (e.g., at a predetermined time interval, such as every X hours, X>0) or in response to a particular set of events occurring (e.g., application crash, involuntary operating system restart, involuntary application restart, a particular log generated by an application or an operating system, a set of logs generated by an application or an operating system, or the like). The data stored by the server may include service requests. For example, a user of a computing device may call technical support when the user encounters an issue with the computing device, thereby initiating a service request. The service request may include information as to how the issue was resolved, such as, for example, replacing a particular component that had failed. The server may also store warranty data associated with each computing device.

Based on the data, the server may use machine learning to predict when a particular component included in multiple computing devices may fail. The machine learning may make predictions based in part on a customer's behavior in terms of service requests under warranty. For example, the machine learning may analyze when, on average, a customer initiates a service request and compare that to when the warranty associated with the customer (or individual computing devices acquired by the customer) expires. The machine learning may determine that the customer saves up service requests until a predetermined time interval prior to expiration of the warranty and then submits multiple service requests corresponding to multiple computing devices.

Based on these predictions, the machine learning may predict one or more potential solutions. For example, the solutions may include having a representative of the manufacturer contact the customer, explain that one or more of the customer's computing devices are likely to encounter issues due to a particular component, and suggest the one or more potential solutions. The one or more potential solutions may include, for example, (i) purchasing an extended warranty, (ii) purchasing a warranty that provides extended benefits (e.g., such as onsite service where a technician comes to the customer's location and repairs the computing devices), (iii) selecting a trade-in program to trade-in the customer's existing computing devices for newer computing devices, (iv) purchasing a service to have a technician come on-site, box up at least a portion of the multiple computing devices, ship the box to a repair depot where the computing devices are repaired, and re-install the repaired computing devices after they are sent to the customer location from the repair depot, or any combination thereof. In this way, the manufacturer can be proactive in addressing predicted issues associated with a customer's computing devices, thereby increasing customer satisfaction, and at the same time, up-selling additional products and/or services to improve profitability.

The machine learning may use Exploratory Data Analysis (EDA) to identify patterns, outliers and correlations. The machine learning may use a holistic view of each customer based on information, such as, for example, a customer's geographic location, how long the customer has been purchasing from a particular manufacturer, customer segmentation, market segmentation, customer satisfaction scores provided by the customer, the customer's installed base, including product data (e.g., which hardware components are included in each computing device), entitlement (e.g., warranty) expirations, product classification by geographical region, and the like. The machine learning may take into consideration, product data, failure rates, known issues, individual component failures, and the like. The machine learning may take into account repair data and return data, including repair reasons and disposition (e.g., was a defective component replaced, what component was used to replace the defective component, was the computing device unrepairable and a replacement device provided, or the like). The machine learning may predict when a customer is likely to send a service request to repair multiple computing devices to enable the customer to be proactive contacted and a solution worked out that does not cause supply chain issues and the like (e.g., due to lack of availability of a particular component). The machine learning may predict customers with a pattern of waiting until a predetermined amount of time (e.g., Y days, Y>0, such as Y=7, 30, or the like) prior to a warranty expiring and then submitting a warranty request for multiple computing devices. The machine learning may predict which customers are likely to respond to which types of upsell offers, e.g., customer 1 is likely to purchase an extended warranty, customer 2 is likely to purchase an extended service contract, customer 3 is likely to purchase a bulk pack and repair service contract, customer 4 is likely to purchase new computing devices with a trade-in allowance for the customer's existing computing devices, and the like. The machine learning may provide demand forecasts for particular components that are predicted to fail, enabling the manufacture to request suppliers to schedule and initiate production of the particular components.

The machine learning's predicted component failures may be used to design future devices to reduce the component failures. For example, if a component from a manufacturer is prone to failure, then the component may be sourced from other manufacturers that provide higher quality components that are less prone to failure. As another example, if one or more components are experiencing failure due to heat, additional cooling techniques may be designed into future products to reduce failure due to heat.

The machine learning may predict which types of components (e.g., processor, memory, hard drive, modem, or the like) have a higher probability of being difficult to source (e.g., causing a backlog). In this way, a manufacturer can anticipate and resolve customer issues faster and more proactively (e.g., before the issues arise), tailor support services to match predicted customer demand, and proactively feed demand predictions into component planning (e.g., manufacturing, inventory, 3rd part suppliers, and the like) to provide for a suitable level of inventory when the predicted demand arises. The predictions made by the machine learning may be used to feed information into the supply chain, e.g., to stock the manufacturer's inventory, provide forecasts to 3rd party suppliers, and the like.

As a first example, a server may include one or more processors and one or more non-transitory computer-readable storage media to store instructions executable by the one or more processors to perform various operations. The server may be associated with a technical support group. The operations may include determining a warranty associated with a set of computing devices acquired (e.g., leased or purchased) by a customer. The operations may include predicting, by a machine learning algorithm being executed by the server, a service date to perform a service to repair at least one computing device in the set of computing devices, based on criteria comprising: (i) the warranty associated with the set of computing devices and (ii) a failure rate of a component included in individual computing devices in the set of computing devices. In some cases, the criteria may include an additional failure rate of the component included in one or more additional computing devices associated with a plurality of additional customers. The operations may include performing a comparison of the predicted service date with an expiration date of the warranty. The operations may include predicting, using the machine learning algorithm and based at least in part on the warranty associated with the set of computing devices, one or more recommended solutions to perform the service to the at least one computing device. For example, the one or more recommended solutions may include: (i) purchasing an extended warranty to extend the warranty beyond the expiration date, (ii) purchasing an enhanced warranty that adds additional services to the warranty associated with the set of computing devices (e.g., the additional services may include) on-site service, (iii) a clinic service to send a technician on-site to send at least a portion of the set of computing devices to a repair depot to create repaired computing devices and to reinstall that repaired computing devices, and (iv) purchasing a trade-in program to trade-in the set of computing devices for a second set of newer computing devices. The operations may include determining a quantity of the component that is in stock in a parts inventory of a manufacturer of the set of computing devices. The operations may include requesting bids from one or more authorized suppliers to provide a particular quantity of the component to a manufacturer of the set of computing devices. The operations may include determining that a plurality of leased computing devices that include the component are scheduled to be returned at a particular date, and after the particular date, removing the component from the plurality of leased computing devices to repair at least one computing device in the set of computing devices. The operations may include determining that a plurality of computing devices that include the component are associated with a second customer, providing the second customer with a trade-in program to acquire the plurality of computing devices, and removing the component from the plurality of computing devices to repair at least one computing device in the set of computing devices. The operations may include receiving a purchase request to purchase at least one solution of the one or more recommended solutions and scheduling the at least one solution to address the failure rate of the component prior to the predicted service date.

As a second example, the operations may include determining, using machine learning and based on criteria comprising service requests associated with a set of computing devices, that a component included in the set of computing devices is predicted to fail at a predetermined date. In some cases, the criteria may include an additional failure rate of the component included in one or more additional computing devices associated with a plurality of additional customers. The operations may include determining one or more customers associated with the plurality of computing devices, determining a particular warranty associated with a particular customer of the one or more customers, and predicting, using the machine learning algorithm and based on the warranty associated with the set of computing devices, one or more recommended solutions to perform the service to repair the at least one computing device. For example, the one or more recommended solutions may include: (i) purchasing an extended warranty to extend the warranty beyond the expiration date, (ii) purchasing an enhanced warranty that adds additional services to the existing warranty associated with the set of computing devices (e.g., the additional services may include on-site service), (iii) purchasing a clinic service to send a technician on-site to send at least a portion of the set of computing devices to a repair depot to create repaired computing devices and to reinstall that repaired computing devices, and (iv) purchasing a trade-in program to trade-in the set of computing devices for a second set of newer computing devices. The operations may include determining a quantity of the component that is in stock in a parts inventory of a manufacturer of the set of computing devices. The operations may include requesting bids from one or more authorized suppliers to provide a particular quantity of the component to the manufacturer of the set of computing devices. The operations may include determining that a plurality of leased computing devices that include the component are scheduled to be returned at a particular date, and after the particular date, removing the component from the plurality of leased computing devices to repair at least one computing device in the set of computing devices. The operations may include determining that a plurality of computing devices that include the component are associated with a second customer, providing the second customer with a trade-in program to acquire the plurality of computing devices, and removing the component from the plurality of computing devices to repair at least, one computing device in the set of computing devices. The operations may include receiving, by the server, a purchase request to purchase at least one solution of the one or more recommended solutions, and scheduling, by the server, the at least one solution to address the failure rate of the component prior to the predicted service data.

FIG. 1 is a block diagram of a system 100 that includes a server to predict when one or more computing devices may have an issue, according to some embodiments. The system 100 may include multiple computing devices, such as a representative computing device 102 connected to a server 104 via one or more networks 106.

The computing device 102 may include multiple applications 108, including an operating system, a basic input output system (BIOS), device drivers, firmware, software applications, and other types of software and firmware. The computing device 102 may include usage data 110 associated with how the applications 108 are used. The computing device 102 may include logs 112 that are generated by the applications 108. For example, the logs 112 may include installation logs, error logs, restart logs, memory dumps, and other types of logs generated by the applications 108. The computing device 102 may include configuration data 114 that includes data associated with a software configuration and a hardware configuration of the computing device 102. The software configuration data may indicate what software is installed and how each piece of software is configured, such as parameter settings associated with each piece of software.

The hardware configuration data in the configuration data 114 may include information describing hardware components in the computing device 102, such as, for example, a type of processor, a clock speed of the processor, an amount of first level cache of the processor, an amount of second-level cache of the processor, a number of cores of the processor, an amount of random-access memory (RAM), a speed at which the RAM operates, a type of RAM (e.g., double data rate 3 (DDR3), DDR4 or the like), a number and a type of each storage device (e.g., hard drive, solid state drive (SSD), and the like), communication capabilities (e.g., Ethernet, WiFi, Bluetooth, and the like), a type of display device (e.g., light-emitting diode (LED), organic LED (OLED), or another type of display device), whether the display device is touch sensitive, a type of keyboard, a number and a type of accessible ports (e.g., Ethernet, universal serial bus (USB), high definition media interface (HDMI), Thunderbolt, another type of display interface, alternating current (AC) or direct-current (DC) input, and other hardware related components.

The computing device 102 may include a device identifier 116 that uniquely identifies the computing device 102 from other computing devices. For example, the device identifier 116 may be a serial number, a service tag, a media access control (MAC) identifier, or another type of unique identifier. The computing device 102 may, periodically or in response to determining that a particular set of events has occurred, send telemetry data 118 that includes the usage data 110, the logs 112, the configuration data 114, and the device identifier 116 to the server 104. For example, the computing device 102 may send the telemetry data 118 at a periodic interval, such as every X minutes or X hours (X>0). As another example, the computing device 102 may send the telemetry data 118 in response to determining that a particular set of one or more events has occurred, such as an involuntary operating system restart, an application crash, a blue screen of death (BSOD), one or more particular logs have been generated, or the like. The term "set" as used herein refers to one or more items.

The server 104 may receive the telemetry data 118 and store the telemetry data 118 along with other data associated with a device identifier 120. For example, a device identifier 120(1) may be associated with the computing device 102(1) and a device identifier 120(N) may be associated with the computing device 102(N) (N>0). In this example, the device identifier 116 may be one of the device identifiers 120. Associated with each of the device identifiers 120 may be data 122. For example, the device identifier 120(1) may have associated data 122(1) and device identifier 120(N) may have associated data 122(N). The representative data 122(N) may include historical (e.g., previously received) telemetry data 124, historical (e.g., previous) service requests 126, warranty data 128, and the like. The warranty data 128 may include what is covered by the warranty, what is excluded from the warranty, when the warranty period starts, when the warranty period ends, and other warranty-related information.

The server 104 may include machine learning 130. Machine learning 130 may encompass one or more machine learning algorithms used to perform the various predictions described herein. The machine learning 130 may include one or more types of supervised learning, such as, for example, Support Vector Machines (SVM), linear regression, logistic regression, naive Bayes, linear discriminant analysis, decision trees, k-nearest neighbor algorithm, Neural Networks such as Multilayer perceptron or similarity learning, or the like. The machine learning 130 may be periodically retrained with a latest data to improve an accuracy of the machine learning 130.

The machine learning 130 may use the data 122 to make various predictions 132, as described herein. For example, the machine learning 130 may use the data 122 to predict when a particular component is likely to fail (e.g., predicted to fail after Y months in operation), when computing devices that include the particular components are likely to have issues, when a particular customer is predicted to initiate a service request to address an issue associated with multiple computing devices of the particular customer, and the like. The predictions 132 may be fed into a supply chain 134 to enable a supply of a particular component to be stocked in advance of predicted service requests caused by the particular component failing. Customer data 136 may identify which particular computing devices 102 each particular customer has acquired (e.g., purchased or leased). For example, the device identifiers 120 may be correlated with the customer data 136 to identify a set of the computing devices 102 associated with a particular customer.

The machine learning 130 may be used to predict recommendations 140, e.g., solutions that a particular customer is likely to select. For example, the recommendations 140 may include a warranty recommendation 142 to purchase an extended warranty, an enhanced warranty, or both. The recommendations 140 may include a services recommendation 144 to ® purchase a particular service, such as on-site technical support (e.g., in which a technician is dispatched to a customer location to troubleshoot and resolve issues that the customer is having with one or more computing devices) or on-site repair depot servicing (e.g., in which a technician is dispatched to a customer location to box up computing devices having issues, send them to a repair depot for repair, and redeploy and reinstall the repaired computing devices at the customer location). The recommendations 140 may include a trade-in recommendation 146 to enable a particular customer to trade-in at least a portion of the set of computing devices associated with the particular customer for newer computing devices. For example, the particular customer may receive a credit when trading in a portion of the set of computing devices for newer computing devices. The newer computing devices may be brand-new or may be refurbished (e.g., lease returned and refurbished) computing devices.

When a customer associated with a computing device, such as the representative computing device 102, has an issue, the customer may initiate a user communication 148 and may receive in response technician communications 150 from a technician associated with a customer support group of the manufacturer. The customer and the technician may exchange multiple communications to create a communication session 152. The communication session 152 may include email, chat (e.g., Zendesk®), video conferencing (e.g., Skype®, Facetime®, Zoom®), audio conferencing, a voice call, or another type of communication.

The machine learning 130 may also provide information to a procurement engine 138 used to procure one or more components using the supply chain 134. For example, the procurement engine 138 may determine how many components are currently in the manufacturer's parts inventory. If the number of parts (e.g., a quantity of a particular component) currently in the manufacturer's parts inventory is insufficient to meet the predicted service requests caused when the particular component fails, then the procurement engine 138 may initiate a process to acquire additional inventory of the particular component. For example, the procurement engine 138 may ask one or more authorized suppliers to determine whether they have additional inventory of the particular component and if not, the procurement engine 138 may submit a purchase order to purchase additional inventory by a particular date (e.g., prior to the date that the service requests are predicted to be received). The procurement engine 138 may post on an open market a request for bids to provide additional inventory of the particular component. The open market may be used by authorized suppliers to bid to provide a particular quantity of the particular component that the authorized supplier either has an inventory or is able to obtain or manufacture. The procurement engine 138 may analyze lease return data to determine when leased computing devices that include the particular component are to be returned. Instead of being refurbished, the lease returned computing devices may be disassembled and used for parts. For example, if a particular component is no longer being manufactured or is expensive to obtain, the particular component may be cheaper to obtain by disassembling the lease returned computing devices and using the components (e.g., obtained as a result of the disassembly process) to repair the computing devices that are predicted to fail and generate service requests. In some cases, the manufacturer may offer incentives (e.g., increase trade-in value or the like) to receive the lease return computing devices on an earlier date to enable the manufacturer to have the particular component in stock when the customer's computing devices are predicted to be repaired.

The machine learning 130 may be retrained periodically (e.g., at a predetermined time interval) or in response to an event using current data to further improve an accuracy of the predictions. For example, after receiving the purchase request 156, the machine learning 130 may be retrained using the data associated with the customer of the computing device 102.

Thus, a server may use machine learning to analyze service request data associated with multiple computing devices to predict when a particular component may fail or cause issues with the multiple computing devices that include the particular component. The machine learning may analyze (i) a particular customer's previous service requests and (ii) an expiry date associated with a warranty covering at least a portion of the computing devices associated with the particular customer to predict when the particular customer is likely to initiate a service request. The machine learning may predict one or more recommendations to provide the particular customer to avoid having a large number of service request initiated when the manufacturer is unable to address the service requests in a timely fashion. Based on the multiple predictions, a representative of the manufacturer of the computing devices may contact the particular customer to explain that a component failure is predicted to cause issues with at least a portion of the particular customer's computing devices and to offer the one or more recommendations to address the predicted issues. In this way, the particular customer may experience an increase in customer satisfaction because the manufacturer has handled the predicted issues proactively, e.g., before the particular customer has experienced the predicted issues, and offered multiple solutions/recommendations. In addition, the manufacturer may be able to upsell the particular customer with an extended or enhanced warranty, additional support services, a trade-in program to upgrade at least a portion of the computing devices of the particular customer to newer computing devices, and the like.

Figure 2:
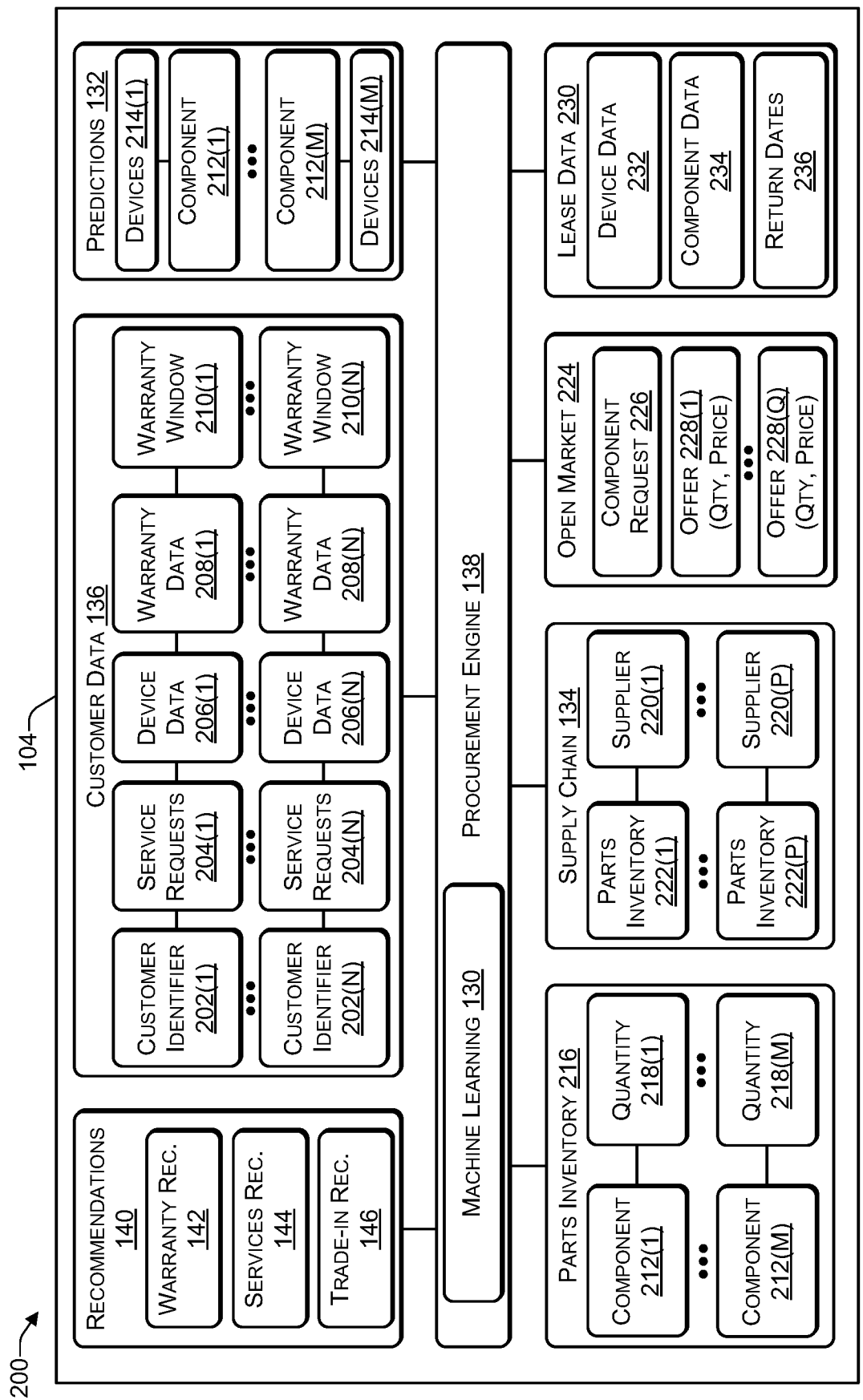
FIG. 2 is a block diagram of components of a server to predict when one or more computing devices may have an issue, according to some embodiments.

FIG. 2 is a block diagram 200 of components of a server to predict when one or more computing devices may have an issue, according to some embodiments. The components illustrated in FIG. 2 may be hosted by the server 104 of FIG. 1.

The procurement engine 138 may use the machine learning 132 make one or more predictions, as described herein, such as when a component is predicted to fail, when computing devices that include the components are predicted to have issues, based on a customer's behavior, when the customer is predicted to initiate service requests, and the like.

The customer data 136 may include a customer identifier 202(1) to a customer identifier 202(N) (N>0). For example, the customer identifier's 202 may include a customer name, a customer address, a customer number, or another type of identifier. The customer data 136 may include service requests 204 associated with each customer, such as service requests 204(1) associated with the customer identifier 202(1) and service requests 204(N) associated with the customer identifier 202(N). The customer data 136 may include device data 206 indicating hardware components included in each of the computing devices associated with a particular customer identifier 202. For example, the device data 206(1) may identify components included in each of the computing devices associated with the customer identifier 202(1) and the device data 206(N) may identify components included in each of the computing devices associated with the customer identifier 202(N). The customer data 136 may include warranty data 208 indicating a warranty associated with each computing device of a particular customer identifier 202. For example, warranty data 208(1) may identify a warranty provided for each of the computing devices associated with the customer identifier 202(1) and warranty data 208(N) may identify a warranty provided for each of the computing devices associated with the customer identifier 202(N). The customer data 136 may include a warranty window 210 that identifies a time interval between a present time and a time when the warranty data 208 indicates that a warranty is set to expire. For example, the warranty window 210(1) may identify a time interval until a current warranty is set to expire for individual computing devices associated with the customer identifier 202(1) and the warranty window 210(N) may identify a time interval until a current warranty is set to expire for individual computing devices associated with the customer identifier 202(N).

The predictions 132 may include a prediction as to when a particular component 212 included in a set of devices 214 is predicted to fail or cause issues. For example, the predictions 132 may indicate when each of components 212(1) to 212(M) (M>0) are predicted to fail based on the service requests 204 and which devices 214(1) to 214(M) are predicted to have issues caused by each of the components 212. For example, a particular component, such as the component 212(M) may be used in multiple devices 214(M), such as, for example, a tablet device, a laptop device, a 2-in-1 device, a desktop device, or another type of computing device.

A parts inventory 216 may be associated with a manufacturer (e.g., Dell®) of computing devices, such as the representative computing device 102 of FIG. 1. The parts inventory 216 may identify the components 212 and the corresponding quantity 218 associated with each of the components 212. For example, the parts inventory 216 of the manufacturer may include a quantity 218(1) of the component 212(1) and a quantity 218(M) of the component 212(M).

The supply chain 134 may identify multiple authorized suppliers and their corresponding parts inventory, such as supplier 220(1) to supplier 220(P) (P>0) and their corresponding parts inventory, such as parts inventory 222(1) and parts inventory 222(P), respectively.

An open market 224 may enable a manufacturer (e.g., Dell®) of computing devices to post a component request 226 indicating that the manufacturer is interested in purchasing a particular quantity of a particular component at no more than a particular price (e.g., a maximum price the manufacturer is will to pay). In response to posting the component request 226 in the open market 224, the manufacturer may receive one or more offers, such as an offer 228(1) to provide a first quantity of the particular component at a first price and an offer 228(Q) (Q>0) to provide a Qth quantity of the particular component at a Qth price. The manufacturer may select from among the offers 228 to supplement the manufacturer's parts inventory 216. For example, the manufacturer may select one or more of the offers 228 by selecting starting with a lowest price offer until the predicted quantity of the particular component has been satisfied.

Lease data 230 may include device data 232 identifying which components (e.g., hardware components) are included in computing devices that have been leased and are scheduled to be returned to the manufacturer ("lease returns"). Component data 234 may provide additional data associated with each of the hardware components included in the computing devices that will be lease returned. For example, the additional data may include a version of a particular component, a manufacturer date of the particular component, a manufacturer of the particular component, and other component related data. Return dates 236 may indicate when the leased computing devices are scheduled to be returned to the manufacturer. The lease data 230 may be used to identify components that can be harvested (e.g., removed) from the lease returned computing devices and used to replace the same or similar (e.g., pin-compatible) components in computing devices predicted to have issues. In this way, by harvesting components from lease returns, the manufacturer may save money and acquire particular components quickly. For example, components that are no longer being manufactured or have been designated end-of-life (EOL) may be difficult to find and/or expensive to purchase. In such cases, harvesting the components from lease returned computing devices may be more cost-effective than attempting to purchase or source rare (e.g., EOL) components.

Figure 3:
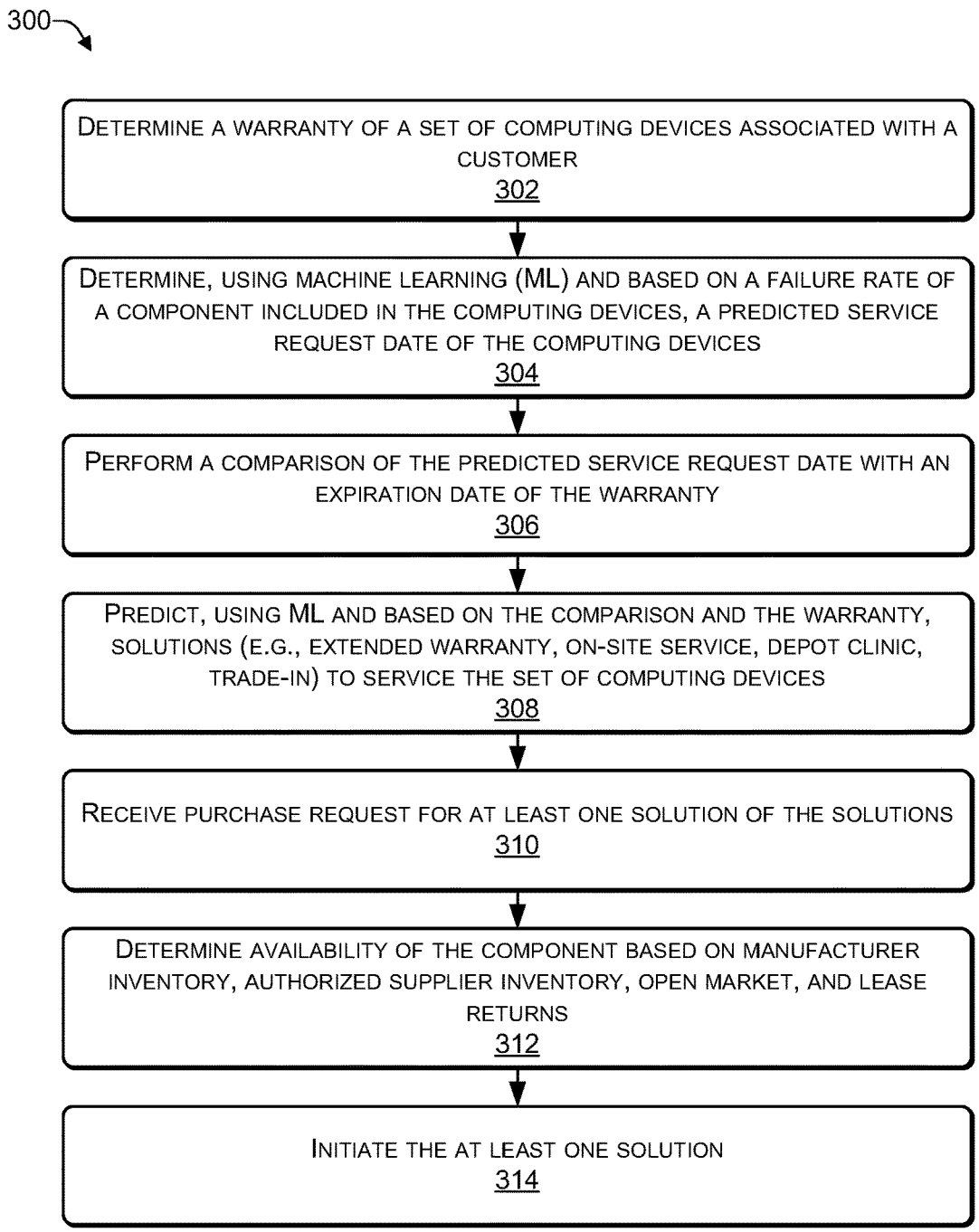
FIG. 3 is a flowchart of a process that includes using machine learning to predict a service date of a set of computing devices, according to some embodiments.
Figure 4:
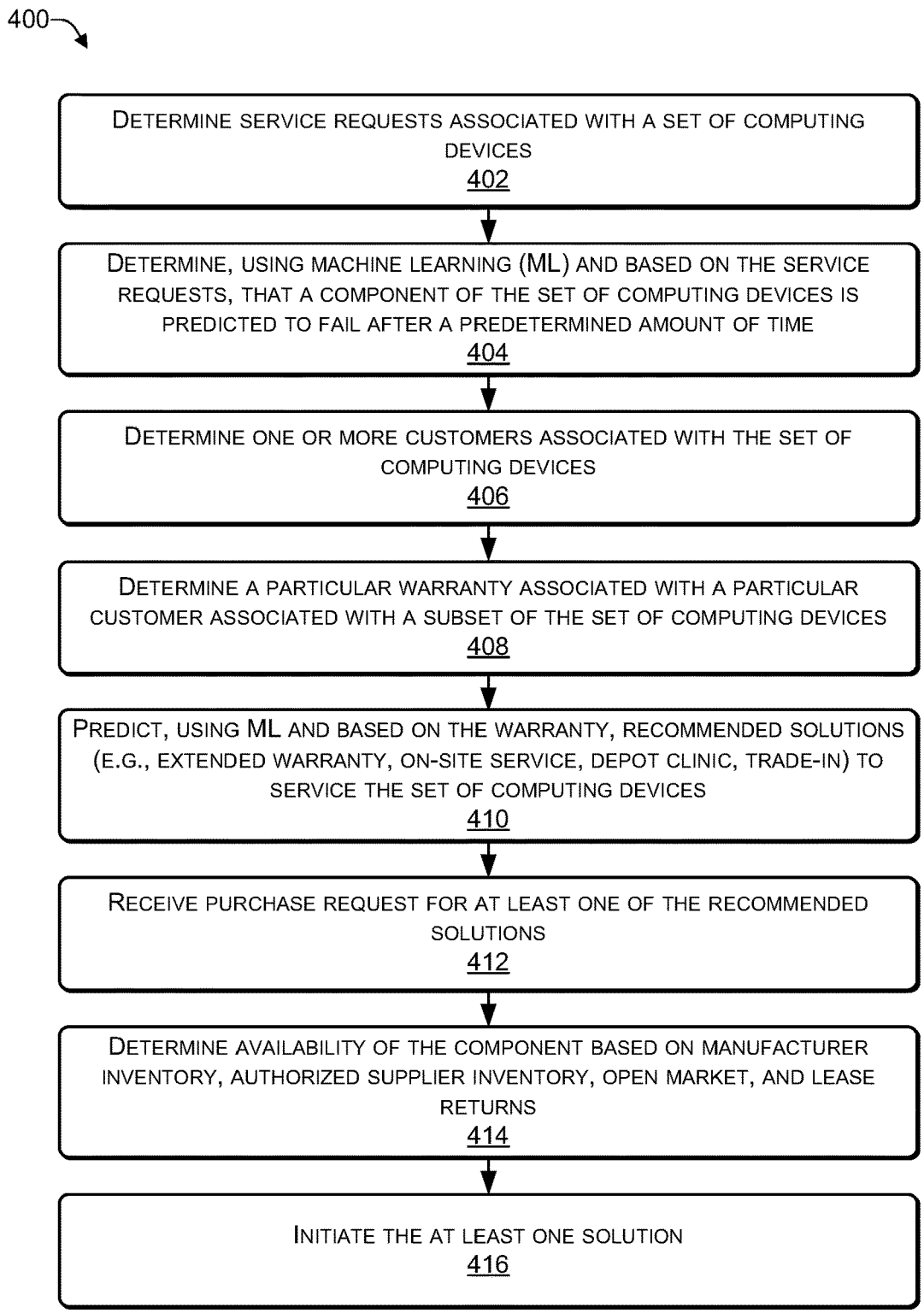
FIG. 4 is a flowchart of a process that includes using machine learning to predict a when a component included in a set of computing devices may fail, according to some embodiments.
Figure 5:
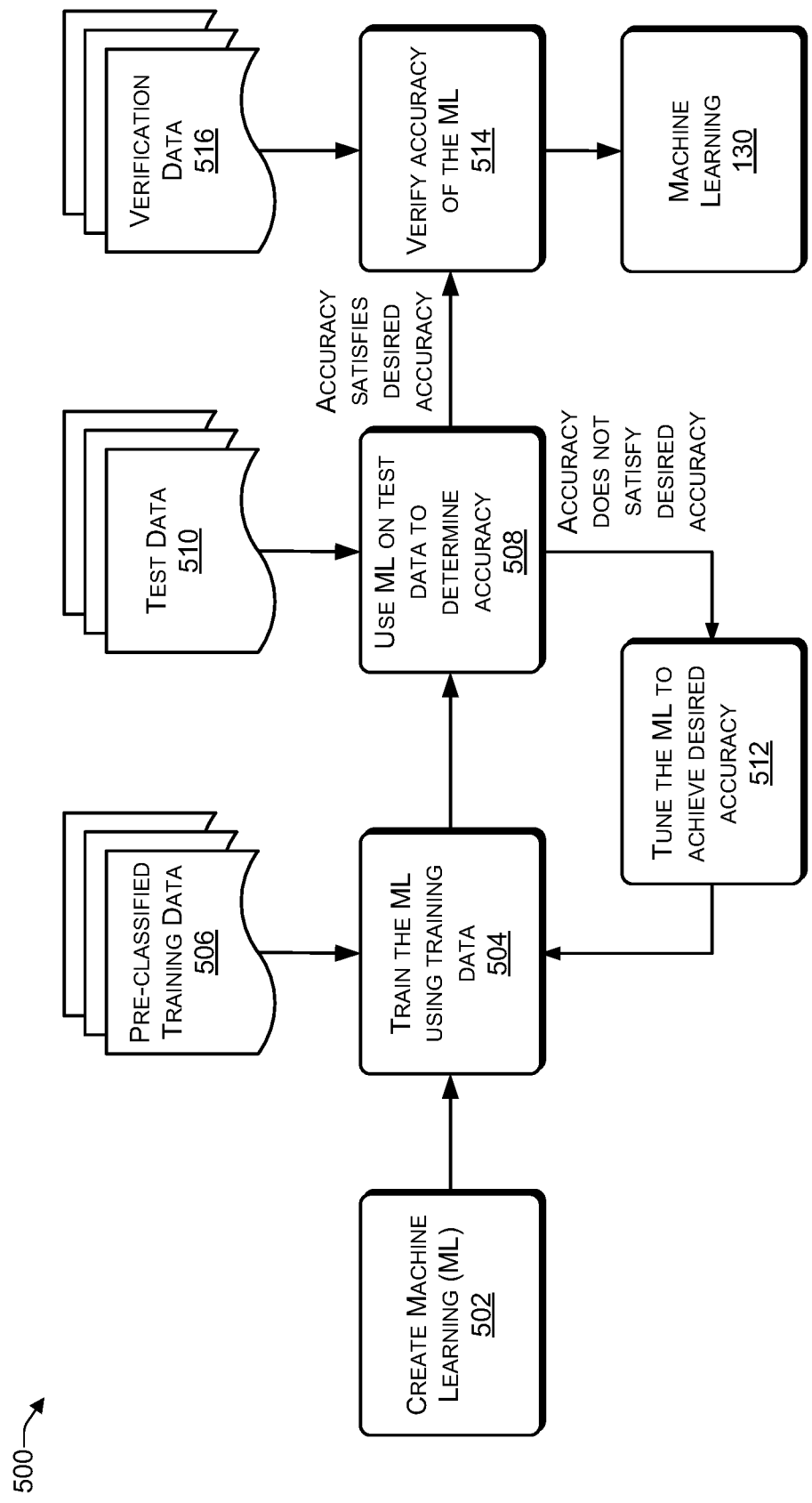
FIG. 5 is a flowchart of a process to train a machine learning algorithm, according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400 and 500 are described with reference to FIGS. 1 and 2 as described above, although other models, frameworks, systems and environments may be used to implement this process.

FIG. 3 is a flowchart of a process 300 that includes using machine learning to predict a service date of a set of computing devices, according to some embodiments. The process 300 may be performed by one or more software components of the server 104.

At 302, the process may determine a warranty associated with a set of computing devices associated with a customer. For example, in FIG. 2, the server 104 may determine the warranty data 208(N) associated with a set of computing devices acquired (e.g., purchased or leased) by a customer identified by the customer identifier 202(N) (N>0).

At 304, the process may determine, using machine learning and based on the failure rate of a component included in at least a portion of the set of computing devices, a predicted service request date of the computing devices. For example, in FIG. 1, the server 104 may determine based on the historical service requests 126 included in the data 122 that a component included in at least a portion of the set of computing devices has a particular failure rate and is predicted to fail at a particular date. To illustrate, the server 104 may determine based on the historical service requests 126 that a component, such as, for example, a random-access memory (RAM) stick, a storage drive, a network interface card (NIC), a processor (e.g., central processing unit (CPU)), or another type of component is predicted to fail T days (e.g., T>0) after the computing device has initially been put in service by the customer. The predicted service request date may be the date at which the computing device was initially put in service by the customer plus T. For example, if the machine learning 130 predicts, based on the historical service requests 126, that a storage drive is predicted to fail after time T (e.g., 2 years), and a computing device that includes the storage drive was put into service on a date D (e.g., Jun. 1, 2020), then the predicted service request thus date of the computing device is T+D (e.g., Jun. 1, 2022). Thus, the predicted service request date may be the date when the component is predicted to fail, thereby causing an issue with the computing device, resulting in the customer contacting customer support to initiate a service request. Alternately, the predicted service request date may be the date when the customer is predicted to contact customer support to report an issue, which may be a significant amount of time (e.g., Y days, Y>0, Y=7, 10, 15, 20, 30, 45, 60 or the like) after a first computing device of the customer has encountered the issue. For example, some customers may wait for multiple issues to accumulate prior to initiating a service request for multiple computing devices.

At 306, the process may perform a comparison of the predicted service request date with an expiration date of the warranty. For example, in FIG. 1, the predicted service request date may be one of the predictions 132 and the machine learning 130 may compare the predicted service request date with an expiration date of the warranty identified in the warranty data 128. The period of time between a predicted service request date and the expiration date of the warranty is also referred to as the warranty window 210 in FIG. 2.

At 308, the process may predict using machine learning and based on the comparison and the warranty, one or more recommended solutions to service the set of computing devices. For example, the solutions may include purchasing an extended warranty, purchasing an extended service agreement, purchasing on-site technical support (e.g., technician is dispatched to the customer's location), purchasing an on-site to depot ("depot clinic") service (e.g., technician comes on-site, packs and sends the computing devices to a repair depot where they are repaired, and the redeploys and reinstalls the repaired computing devices), purchasing newer computing devices while trading in the set of computing devices currently acquired (e.g., leased or purchased) by the customer. At 310, the process may receive a purchase request for at least one solution of the solutions that were offered (e.g., at 308). For example, in FIG. 1, the machine learning 130 may predict the recommendations 140 based on the comparison between the predicted service request date and the expiration date of the warranty and, in some cases previous customer behavior, what type of solution to the customer is predicted to select. The recommendations 140 may include, for example, one or more warranty recommendations 142 to purchase an extended warranty (e.g., extending an expiration date of a current warranty), an enhanced warranty (e.g., adding additional features, such as on-site technical support, to the current warranty), or both. The recommendations 140 may include one or more services recommendations, such as on-site service, having a technician come on-site, boxing computing devices, sending the boxed computing devices to a repair depot for repair, and redeploying and reinstalling the repaired computing devices on-site. The recommendations 140 may include a trade-in recommendation 146 that enables the customer to trade-in at least a portion of the computing devices for newer (e.g., new and/or refurbished) computing devices. The trade-in recommendation may enable the customer to trade-in a current set of computing devices that are predicted to have issues in the near future for newer computing devices with better features that are not predicted to have issues in the near future. In addition, the newer computing devices may come with a new warranty that expires after the current warranty and may include additional features, such as on-site repair. In response to receiving the recommendations 140, the customer may send the purchase request 156 to purchase one or more of the recommendations 140 (e.g., recommended solutions). In this way, customer satisfaction may be increased while at the same time increasing profitability for the manufacturer by up selling one or more of the recommendations 140.

At 312, the process may determine an availability of the component based on manufacturer inventory, authorize supplier inventory, open market, lease returns, and a trade-in program. If one or more components are to be used to repair the computing devices, then the process may determine if the manufacturer has sufficient inventory and if not, initiate steps to acquire additional inventory of the one or more components. For example, if a particular component is predicted to fail and the customer selects a solution that does not involve a trade-in, e.g. the purchase request is for one or more of an extended warranty, an extended service, on-site service, depot repair, or the like, then the manufacturer may verify that the manufacturer has or can obtain an adequate quantity of the particular component to enable the computing devices to be repaired. If the manufacturer determines that the manufacturer does not have in stock a sufficient quantity of the particular component, the manufacturer may ask authorized suppliers whether they have a quantity of the particular component to supplement the manufacturer's stock. For example, in FIG. 2, the procurement engine 138 may check the manufacturer's parts inventory 216 to determine whether the quantity 218 of a particular component 212 is sufficient to repair the computing devices predicted to have issues. If the parts inventory 216 is insufficient, then the procurement engine 138 may check the supply chain 134 by asking one or more of the suppliers 220 to check their respective parts inventory 222 to determine if one or more of the suppliers 220 is able to provide additional quantities of the particular component. Procurement engine 138 may post a component request to 26 to enable authorized suppliers, such as the suppliers 220, to provide offers 228 to supply a particular quantity of the particular component. The procurement engine 138 may look at the least data 230 to identify lease returns that include the particular component. For example, if the return dates 236 indicate that the particular component can be harvested from the lease returned devices in an amount of time sufficient to enable the manufacturer to repair the computing devices that are predicted to have component failure, then the procurement engine 138 may designate that at least some of the lease returned computing devices be harvested for the particular component rather than being refurbished and sold.

At 314, the process may initiate the at least one solution for which the purchase request was received. For example, in FIG. 1, in response to receiving the purchase request 156 for one or more of the recommended solutions 140, the server 104 may initiate at least one solution for which the purchase request 156 was received. For example, in FIG. 1, the server 104 may initiate one or more of extending a current warranty (e.g., of a customer associated with the computing device 102), adding services to an existing warranty, initiating a trade-in process, or any combination thereof.

Thus, a server may determine a warranty associated with a set of computing devices of a customer. Based on a failure rate of a component included in the computing devices, a machine learning algorithm may be used to predict when the component may fail and when, based on the customer's past behavior, the customer is predicted to initiate a service request. For example, some customers may wait until a predetermined time interval (e.g., X days, X>0, such as X=7, 30, 60, or the like) prior to expiration of the warranty before initiating a service request for an issue. A warranty window may be determined by comparing when the issue is predicted to occur with an expiration date of the warranty. Based on the customer's past behavior, the machine learning may predict one or more solutions to offer (e.g., upsell) the customer, such as an extended warranty, on-site service, on-site to depot, trade-in or another type of service. For example, a manufacturer's representative may contact the customer and explain that at least a portion of the computing devices include a component that is predicted to fail by a particular date and that instead of waiting a predetermined time interval prior to the expiration of the warranty to submit a service request, the manufacturer is offering recommended solutions to address the predicted component failure in such a way as to reduce an impact of the component failure on the customer. In this way, the customer is shown ways to avoid having a large number of computing devices unavailable (e.g., inoperable or being repaired) for a period of time. Thus, customer satisfaction may be improved because the customer avoids having a large number of computing devices unavailable for the period of time and the manufacturer may increase profits by upselling one or more of the recommended solutions to the customer.

FIG. 4 is a flowchart of a process 400 that includes using machine learning to predict a when a component included in a set of computing devices may fail, according to some embodiments. The process 400 may be performed by a server, such as the server 104 of FIG. 1 and FIG. 2.

At 402, the process may determine service requests associated with a set of computing devices. At 404, the process may use machine learning to analyze the service requests and predict that a component of the set of computing devices is predicted to fail after predetermined amount of time. For example, in FIG. 1, the machine learning 130 may analyze the historical service requests 126 included in the data 122 associated with a set of computing devices (e.g., the computing devices 102) to predict that a particular component included in at least a portion of the set of computing devices may fail after predetermined amount of time. To illustrate, the server 104 may determine based on the historical service requests 126 that a component, such as, for example, a random-access memory (RAM) stick, a storage drive, a network interface card (NIC), a processor (e.g., central processing unit (CPU)), or another type of component is predicted to fail T days (e.g., T>0) after the computing device has initially been put in service by the customer. For example, if the machine learning 130 predicts, based on the historical service requests 126, that a storage drive is predicted to fail after time T (e.g., 2 years), and a computing device that includes the storage drive was put into service on a date D (e.g., Jun. 1, 2020), then machine learning 130 may predict that the computing device is predicted to fail on T+D (e.g., Jun. 1, 2022).

At 406, the process may determine one or more customers associated with the set of computing devices. At 408, the process may determine a particular warranty associated with a particular customer associated with a subset of the set of computing devices. At 410, the process may predict using machine learning and based on the warranty, one or more solutions to service the set of computing devices prior to component failing. At 412, the process may receive a purchase request for at least one of the recommended solutions. For example, based on identifying which computing devices are predicted to fail (e.g., Laptop XYZ), the process may identify the customers that have acquired (e.g., leased or purchased) the computing devices that are predicted to fail. The process may identify a warranty associated with each of the computing devices that are predicted to fail and with each of the customers that have acquired those computing devices. The process may use machine learning to predict based on the warranty (e.g., an expiration date of the warranty) and the customer's past behavior, one or more recommended solutions to service the set of computing devices prior to the component failing. For example, in FIG. 1, the server 104 may determine that a particular component is predicted to fail, determine computing devices that include the particular component, identify customers that have acquired the computing devices that include the particular component, and determine a warranty associated with each of the computing devices that include the particular component. The machine learning 130 may predict one or more recommendations 140 to address the predicted component failure to enable the customer to avoid having multiple computing devices unavailable due to issues or due to being repaired. For example, in FIG. 1, the machine learning 130 may predict the recommendations 140 based on the comparison between the predicted service request date and the expiration date of the warranty and, in some cases previous customer behavior, what type of solution to the customer is predicted to select. The recommendations 140 may include, for example, one or more warranty recommendations 142 to purchase an extended warranty (e.g., extending an expiration date of a current warranty), an enhanced warranty (e.g., adding additional features, such as on-site technical support, to the current warranty), or both. The recommendations 140 may include one or more service recommendations, such as on-site service, depot clinic (e.g., a technician comes on-site, boxes and ships computing devices to a repair depot for repair, and redeploys and reinstalls the repaired computing devices on-site). The recommendations 140 may include a trade-in recommendation 146 that enables the customer to trade-in at least a portion of the computing devices for newer (e.g., new and/or refurbished) computing devices. The trade-in recommendation may enable the customer to trade-in a current set of computing devices that are predicted to have issues in the near future for newer computing devices with better features that are not predicted to have issues in the near future. In addition, the newer computing devices may come with a new warranty that expires after the current warranty and may include additional features, such as on-site repair. In response to receiving the recommendations 140, the customer may send the purchase request 156 to purchase one or more of the recommendations 140 (e.g., recommended solutions). In this way, customer satisfaction may be increased while at the same time increasing profitability for the manufacturer by up selling one or more of the recommendations 140.

At 414, the process may determine an availability of the component based at least in part on manufacturer inventory, authorize supplier inventory, open market offers, lease returns, and the like. If one or more components are to be used to repair the computing devices, then the process may determine if the manufacturer has sufficient inventory and if not, initiate steps to acquire additional inventory of the one or more components. For example, if a particular component is predicted to fail and the customer selects a solution that does not involve a trade-in, e.g. the purchase request is for one or more of an extended warranty, an extended service, on-site service, depot repair, or the like, then the manufacturer may verify that the manufacturer has or can obtain an adequate quantity of the particular component to enable the computing devices to be repaired. If the manufacturer determines that the manufacturer does not have in stock a sufficient quantity of the particular component, the manufacturer may ask authorized suppliers whether they have a quantity of the particular component to supplement the manufacturer's stock. For example, in FIG. 2, the procurement engine 138 may check the manufacturer's parts inventory 216 to determine whether the quantity 218 of a particular component 212 is sufficient to repair the computing devices predicted to have issues. If the parts inventory 216 is insufficient, then the procurement engine 138 may check the supply chain 134 by asking one or more of the suppliers 220 to check their respective parts inventory 222 to determine if one or more of the suppliers 220 is able to provide additional quantities of the particular component. Procurement engine 138 may post a component request to 26 to enable authorized suppliers, such as the suppliers 220, to provide offers 228 to supply a particular quantity of the particular component. The procurement engine 138 may look at the least data 230 to identify lease returns that include the particular component. For example, if the return dates 236 indicate that the particular component can be harvested from the lease returned devices in an amount of time sufficient to enable the manufacturer to repair the computing devices that are predicted to have component failure, then the procurement engine 138 may designate that at least some of the lease returned computing devices be harvested for the particular component rather than being refurbished and sold.

At 416, the process may initiate the at least one solution for which the purchase request was received. For example, in FIG. 1, in response to receiving the purchase request 156 for one or more of the recommended solutions 140, the server 104 may initiate at least one solution for which the purchase request 156 was received. For example, in FIG. 1, the server 104 may initiate one or more of extending a current warranty (e.g., of a customer associated with the computing device 102), adding services to an existing warranty, initiating a trade-in process, or any combination thereof.

Thus, a server may determine service requests associated with a set of computing devices (e.g., the set of computing devices may include computing devices that are sending telemetry data to the server). Machine learning may be used to analyze the service requests to identify a component that is predicted to fail after a predetermined period of time. For example, if multiple service requests indicate that component ABC typically fails after two years in-service, the machine learning may predict that computing devices that include component ABC may fail after two years in-service. The server may identify one or more customers that have acquired computing devices that include component ABC and determine a warranty associated with each of the computing devices, each of the customers, or both. The machine learning may predict based on the warranty, recommended solutions to address the predicted component failure prior to the component actually failing. In this way, the manufacturer can avoid the customer having multiple computing devices that are unavailable because the computing devices have issues or are being repaired, thereby increasing customer satisfaction. In addition, the customer may feel valued because the manufacturer has proactively contacted them prior to the customer encountering issues with the computing devices. Further, the manufacturer may be able to upsell products and/or services to the customer to increase profitability.

FIG. 5 is a flowchart of a process 500 to train a machine learning algorithm, according to some embodiments. The process 500 may be performed by the server 104 of FIG. 1.

At 502, the machine learning algorithm (e.g., software code) may be created by one or more software designers. At 504, the machine learning algorithm may be trained using pre-classified training data 506. For example, the training data 506 may have been pre-classified by humans, by machine learning, or a combination of both. After the machine learning has been trained using the pre-classified training data 506, the machine learning may be tested, at 508, using test data 510 to determine an accuracy of the machine learning. For example, in the case of a classifier (e.g., support vector machine), the accuracy of the classification may be determined using the test data 510.

If an accuracy of the machine learning does not satisfy a desired accuracy (e.g., 95%, 98%, 99% accurate), at 508, then the machine learning code may be tuned, at 512, to achieve the desired accuracy. For example, at 512, the software designers may modify the machine learning software code to improve the accuracy of the machine learning algorithm. After the machine learning has been tuned, at 512, the machine learning may be retrained, at 504, using the pre-classified training data 506. In this way, 504, 508, 512 may be repeated until the machine learning is able to classify the test data 510 with the desired accuracy.

After determining, at 508, that an accuracy of the machine learning satisfies the desired accuracy, the process may proceed to 514, where verification data for 16 may be used to verify an accuracy of the machine learning. After the accuracy of the machine learning is verified, at 514, the machine learning 130, which has been trained to provide a particular level of accuracy may be used.

The process 500 may be used to train each of multiple machine learning algorithms. For example, in FIG. 1, a first machine learning may be used to the predictions 132, a second machine learning may be used to predict the recommendations 140, a third machine learning may be used by the procurement engine 138, and so on.

Figure 6:
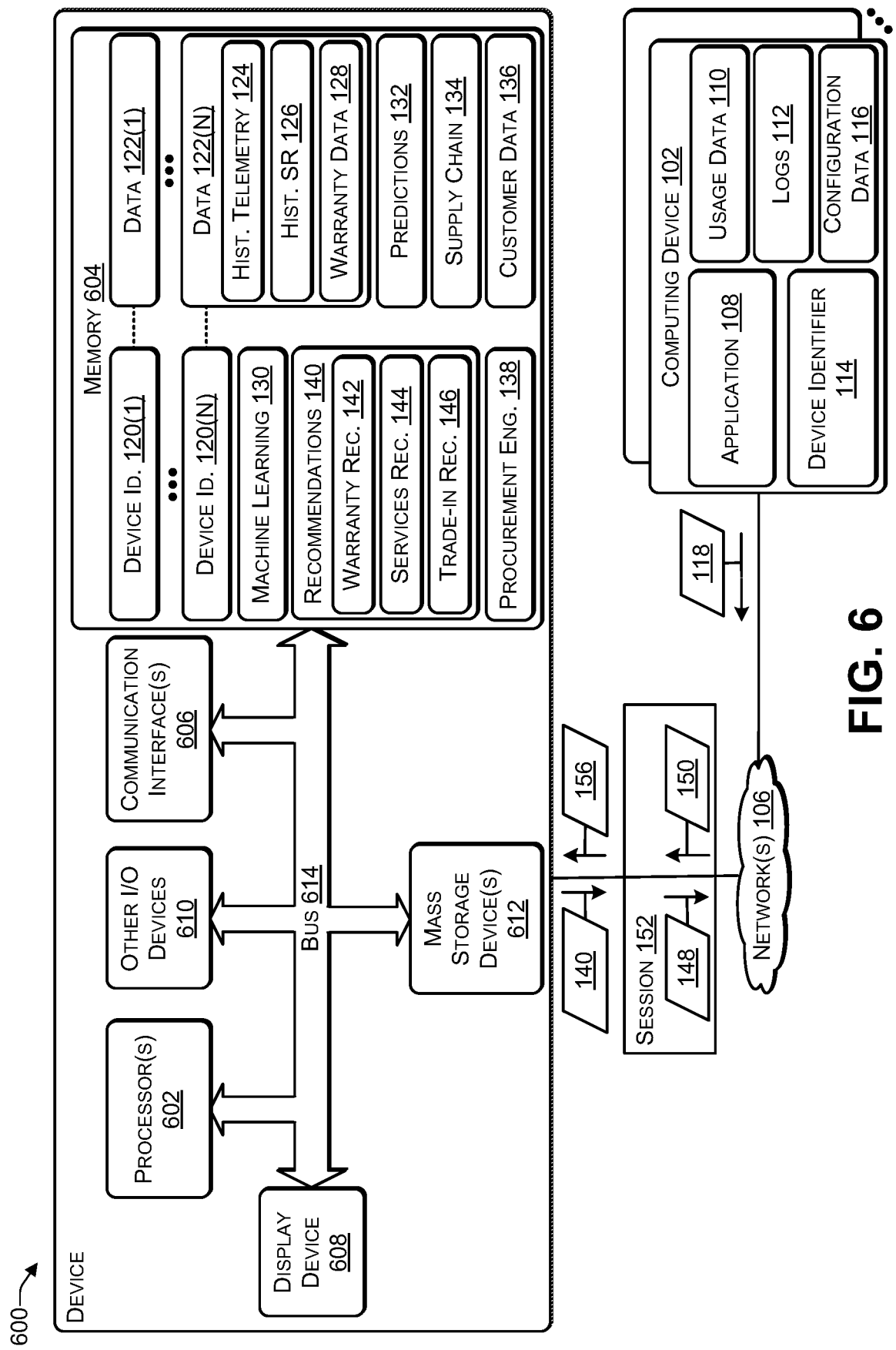
FIG. 6 illustrates an example configuration of a computing device that can be used to implement the systems and techniques described herein.

FIG. 6 illustrates an example configuration of a device 600 that can be used to implement the systems and techniques described herein, such as for example, the computing devices 102 and/or the server 104 of FIG. 1. As an example, the device 600 is illustrated in FIG. 6 as implementing the server 104 of FIG. 1.

The device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 110. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data, including, for example, the device identifiers 120, the data 122, the machine learning 130, the recommendations 140, the procurement engine 138, the predictions 132, the supply chain 134, and the customer data 136.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a server associated with a technical support group, a warranty associated with a set of computing devices acquired by a customer;
   controlling, by the server, the set of computing devices to send telemetry data to the server in response to an occurrence of a particular set of events, wherein the telemetry data comprises operational data collected from sensors in the set of computing devices;
   determining a predicted service date to perform a service to at least one computing device in the set of computing devices, by a machine learning algorithm being executed by the server and based on criteria comprising:
      the warranty associated with the set of computing devices,
      a failure rate of a component included in individual computing devices in the set of computing devices, and
      the telemetry data received from the set of computing devices;
   performing, by the server, a comparison of the predicted service date with an expiration date of the warranty;
   predicting, using the machine learning algorithm being executed by the server and based at least in part on the warranty associated with the set of computing devices, one or more recommended solutions to perform the service to the at least one computing device;
   receiving, by the server, a purchase request to purchase at least one solution of the one or more recommended solutions;
   designing future versions of the set of computing devices to reduce component failures based on predicted component failures, wherein the designing includes:
      identifying critical components prone to failure based on the telemetry data and the predicted component failures,
      modifying cooling systems in the future versions to reduce heat-related failures of the identified critical components, and
      selecting alternative manufacturers for the identified critical components to improve reliability;

scheduling, by the server, the at least one solution to address the failure rate of the component prior to the predicted service date; and implementing the at least one solution, wherein the implementation includes at least one of:
- extending the warranty beyond the expiration date,
- dispatching a technician to perform on-site service;
- sending at least a portion of the set of computing devices to a repair depot, or
- initiating a trade-in of the set of computing devices for newer computing devices.

2. The method of claim 1, wherein the criteria further comprises:
an additional failure rate of the component included in one or more additional computing devices associated with a plurality of additional customers.

3. The method of claim 1, wherein the one or more recommended solutions comprise:
- purchasing an extended warranty to extend the warranty beyond the expiration date;
- purchasing an enhanced warranty that adds additional services to the warranty associated with the set of computing devices, the additional services comprising on-site service;
- purchasing a clinic service to send a technician on-site to send at least a portion of the set of computing devices to a repair depot to create repaired computing devices and to reinstall the repaired computing devices; and
- purchasing a trade-in program to trade-in the set of computing devices for a second set of newer computing devices.

4. The method of claim 1, further comprising:
determining a quantity of the component that is in stock in a parts inventory of a manufacturer of the set of computing devices.

5. The method of claim 1, further comprising:
requesting bids from one or more authorized suppliers to provide a particular quantity of the component to a manufacturer of the set of computing devices.

6. The method of claim 1, further comprising:
determining that a plurality of leased computing devices that include the component are scheduled to be returned at a particular date; and
after the particular date, removing the component from the plurality of leased computing devices to repair at least one computing device in the set of computing devices.

7. The method of claim 1, further comprising:
determining that a plurality of computing devices that include the component are associated with a second customer;
providing the second customer with a trade-in program to acquire the plurality of computing devices; and
removing the component from the plurality of computing devices to repair at least, one computing device in the set of computing devices.

8. A server comprising:
one or more processors; and
one or more non-transitory computer readable media storing instructions executable by the one or more processors to perform operations comprising:
determining a warranty associated with a set of computing devices acquired by a customer;
controlling the set of computing devices to send telemetry data to the server in response to an occurrence of a particular set of events, wherein the telemetry data comprises operational data collected from sensors in the set of computing devices;
determining a predicted service date to perform a service to at least one computing device in the set of computing devices, by a machine learning algorithm being executed by the server and based on criteria comprising:
- the warranty associated with the set of computing devices,
- a failure rate of a component included in individual computing devices in the set of computing devices, and
- the telemetry data received from the set of computing devices;
performing a comparison of the predicted service date with an expiration date of the warranty;
predicting, using the machine learning algorithm being and the warranty associated with the set of computing devices, one or more recommended solutions to perform the service to the at least one computing device;
receiving a purchase request to purchase at least one solution of the one or more recommended solutions;
designing future versions of the set of computing devices to reduce component failures based on predicted component failures, wherein the designing includes:
- identifying critical components prone to failure based on the telemetry data and the predicted component failures,
- modifying cooling systems in the future versions to reduce heat-related failures of the identified critical components, and
- selecting alternative manufacturers for the identified critical components to improve reliability;
scheduling the at least one solution to address the failure rate of the component prior to the predicted service date; and
implementing the at least one solution, wherein the implementation includes at least one of:
- extending the warranty beyond the expiration date,
- dispatching a technician to perform on-site service;
- sending at least a portion of the set of computing devices to a repair depot, or
- initiating a trade-in of the set of computing devices for newer computing devices.

9. The server of claim 8, wherein the criteria further comprises:
an additional failure rate of the component included in one or more additional computing devices associated with a plurality of additional customers.

10. The server of claim 8, wherein the one or more recommended solutions comprise:
- purchasing an extended warranty to extend the warranty beyond the expiration date;
- purchasing an enhanced warranty that adds additional services to the warranty associated with the set of computing devices, the additional services comprising on-site service;
- purchasing a clinic service to send a technician on-site to send at least a portion of the set of computing devices to a repair depot to create repaired computing devices and to reinstall the repaired computing devices; and
- purchasing a trade-in program to trade-in the set of computing devices for a second set of newer computing devices.

11. The server of claim 8, further comprising:
determining a quantity of the component that is in stock in a parts inventory of a manufacturer of the set of computing devices.

12. The server of claim 8, further comprising:
requesting bids from one or more authorized suppliers to provide a particular quantity of the component to a manufacturer of the set of computing devices.

13. The server of claim 8, further comprising:
determining that a plurality of leased computing devices that include the component are scheduled to be returned at a particular date; and
after the particular date, removing the component from the plurality of leased computing devices to repair at least one computing device in the set of computing devices.

14. The server of claim 8, further comprising:
determining that a plurality of computing devices that include the component are associated with a second customer;
providing the second customer with a trade-in program to acquire the plurality of computing devices; and
removing the component from the plurality of computing devices to repair at least one computing device in the set of computing devices.

15. One or more non-transitory computer-readable media storing instructions executable by one or more processors to perform operations comprising:
determining, using machine learning and based on criteria comprising service requests associated with a set of computing devices, that a component included in the set of computing devices is predicted to fail at a predetermined date;
controlling the set of computing devices to send telemetry data to a server in response to an occurrence of a particular set of events, wherein the telemetry data comprises operational data collected from sensors in the set of computing devices;
determining one or more customers associated with the plurality of computing devices;
determining a warranty associated with a particular customer of the one or more customers;
predicting, using the machine learning and based at least in part on the warranty associated with the set of computing devices, one or more recommended solutions to address the component that is predicted to fail at the predetermined date;
receiving, from the customer, a purchase request to purchase at least one solution of the one or more recommended solutions;
designing future versions of the set of computing devices to reduce component failures based on predicted component failures, wherein the designing includes:
identifying critical components prone to failure based on the telemetry data and the predicted component failures,
modifying cooling systems in the future versions to reduce heat-related failures of the identified critical components, and
selecting alternative manufacturers for the identified critical components to improve reliability;
scheduling the at least one solution prior to the predetermined date when the component is predicted to fail; and
implementing the at least one solution, wherein the implementation includes at least one of:
extending the warranty beyond the expiration date,
dispatching a technician to perform on-site service;
sending at least a portion of the set of computing devices to a repair depot, or
initiating a trade-in of the set of computing devices for newer computing devices.

16. The one or more non-transitory computer readable media of claim 15, wherein the criteria further comprises:
an additional failure rate of the component included in one or more additional computing devices associated with a plurality of additional customers.

17. The one or more non-transitory computer readable media of claim 15, wherein the one or more recommended solutions comprise:
purchasing an extended warranty to extend the warranty beyond an expiration date of the warranty;
purchasing an enhanced warranty that adds additional services to the warranty associated with the set of computing devices, the additional services comprising on-site service;
purchasing a clinic service to send a technician on-site to send at least a portion of the set of computing devices to a repair depot to create repaired computing devices and to reinstall the repaired computing devices; and
purchasing a trade-in program to trade-in the set of computing devices for a second set of newer computing devices.

18. The one or more non-transitory computer readable media of claim 15, further comprising:
determining a quantity of the component that is in stock in a parts inventory of a manufacturer of the set of computing devices; and
requesting bids from one or more authorized suppliers to provide a particular quantity of the component to the manufacturer of the set of computing devices.

19. The one or more non-transitory computer readable media of claim 15, further comprising:
determining that a plurality of leased computing devices that include the component are scheduled to be returned at a particular date; and
after the particular date, removing the component from the plurality of leased computing devices to repair at least one computing device in the set of computing devices.

20. The one or more non-transitory computer readable media of claim 15, further comprising:
determining that a plurality of computing devices that include the component are associated with a second customer;
providing the second customer with a trade-in program to acquire the plurality of computing devices; and
removing the component from the plurality of computing devices to repair at least, one computing device in the set of computing devices.

\* \* \* \* \*